United States Patent
Tsirkin

(10) Patent No.: US 9,535,732 B2
(45) Date of Patent: Jan. 3, 2017

(54) ZERO COPY TRANSMISSION IN VIRTUALIZATION ENVIRONMENT

(75) Inventor: Michael S. Tsirkin, Yokneam (IL)

(73) Assignee: Red Hat Israel, Ltd., Raanana (IL)

( * ) Notice: Subject to any disclaimer, the term of this patent is extended or adjusted under 35 U.S.C. 154(b) by 1439 days.

(21) Appl. No.: 12/625,452

(22) Filed: Nov. 24, 2009

(65) Prior Publication Data
US 2011/0126195 A1 May 26, 2011

(51) Int. Cl.
G06F 9/455 (2006.01)
G06F 9/54 (2006.01)

(52) U.S. Cl.
CPC .......... *G06F 9/45558* (2013.01); *G06F 9/544* (2013.01); *G06F 9/545* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 5,666,365 A * | 9/1997 | Kostreski | | 370/486 |
| 6,081,518 A * | 6/2000 | Bowman-Amuah | | 370/352 |
| 6,272,550 B1 * | 8/2001 | Deng et al. | | 709/246 |
| 6,304,911 B1 * | 10/2001 | Brcich et al. | | 709/237 |
| 6,366,559 B1 * | 4/2002 | Krishnan et al. | | 370/230 |
| 7,356,039 B1 | 4/2008 | DiMambro | | |
| 7,657,659 B1 * | 2/2010 | Lambeth et al. | | 709/250 |
| 7,729,328 B2 * | 6/2010 | Thubert et al. | | 370/338 |
| 8,060,644 B1 | 11/2011 | Michailidis et al. | | |
| 2005/0091383 A1 * | 4/2005 | Bender et al. | | 709/228 |
| 2006/0034167 A1 * | 2/2006 | Grice et al. | | 370/229 |
| 2006/0112136 A1 | 5/2006 | Shankar et al. | | |
| 2007/0014245 A1 | 1/2007 | Aloni et al. | | |
| 2007/0061492 A1 * | 3/2007 | van Riel | | 710/3 |
| 2007/0147390 A1 | 6/2007 | Jung et al. | | |
| 2008/0065839 A1 | 3/2008 | Pope et al. | | |
| 2008/0120426 A1 * | 5/2008 | Balakrishnan et al. | | 709/230 |
| 2009/0037941 A1 * | 2/2009 | Armstrong et al. | | 719/328 |
| 2009/0119684 A1 * | 5/2009 | Mahalingam et al. | | 719/324 |
| 2009/0276775 A1 * | 11/2009 | Brown et al. | | 718/100 |

(Continued)

OTHER PUBLICATIONS

Menon et al., "Optimizing Network Virtualization in Zen," Apr. 17, 2006, static.usenix.org/event/usenix/06/tech/menon/menon_html/paper.html.*

(Continued)

*Primary Examiner* — Lewis A Bullock, Jr.
*Assistant Examiner* — Kevin X Lu
(74) *Attorney, Agent, or Firm* — Lowenstein Sandler LLP

(57) ABSTRACT

A system for providing a zero copy transmission in virtualization environment includes a hypervisor that receives a guest operating system (OS) request pertaining to a data packet associated with a guest application, where the data packet resides in a buffer of the guest OS or a buffer of the guest application and has at least a partial header created during the networking stack processing. The hypervisor further sends, to a network device driver, a request to transfer the data packet over a network via a network device, where the request identifies the data packet residing in the buffer of the guest OS or the buffer of the guest application, and the hypervisor refrains from copying the data packet to a hypervisor buffer.

23 Claims, 12 Drawing Sheets

(56) References Cited

U.S. PATENT DOCUMENTS

2011/0122884 A1    5/2011    Tsirkin et al.

OTHER PUBLICATIONS

Russell, "virtio: Towards a De-Facto Standard for Virtual I/O Devices", Jul. 2008, ACM SIGOPS Operating Systems Review Research and developments in the Linux kernel vol. 42, Issue 5.*
Brustoloni et al, "Copy Emulation in Checksummed, Multiple-Packet Communication," 1997, Proceedings of the INFOCOM '97, Sixteenth Annual Joint Conference of the IEEE Computer and Communications Societies.*
Chase et al., "End System Optimizations for High-Speed TCP," Apr. 2001, IEEE Communications Magazine, 0163-6804/01.*
Santos et al, "Bridging the Gap between Software and Hardware Techniques for I/O Virtualization," 2008, Proceeding ATC'08 USENIX, pp. 29-42.*
Kurmann et al., "Speculative Defragmentation—Leading Gigabit Ethernet to True Zero-Copy Communication," Mar. 2001, Journal of Cluster Computing, pp. 7-18.*
Willmann et al, "Concurrent Direct Network Access for Virtual Machine Monitors," Feb. 10, 2007, HPCA 2007, IEEE 13th International Symposium.*
Unknown Author, White Paper—Broadcom Ethernet Network Controller Enhanced Virtualization Functionality, Oct. 2009, www.broadcom.com/collateral/wp/Virtualization-WP100-R.pdf.*
Unknown Author, WildPackets—"Packets and Protocols", http://www.wildpackets.com/resources/compendium/wireless_lan/wlan_packets/printable.*
Unknown Author, "Linux Ethernet-Howto: Technical Information", www.tldp.org/HOWTO/Ethernet-HOWTO-7.html, Feb 1, 2001.*
Red Hat Office Action for U.S. Appl. No. 12/625,397, mailed May 7, 2013.
Red Hat Office Action for U.S. Appl. No. 12/625,397, mailed Aug. 20, 2013.
Red Hat Notice of Allowance for U.S. Appl. No. 12/625,397, mailed Jan. 3, 2014.

\* cited by examiner

ZERO COPY TRANSMISSION IN VIRTUALIZATION ENVIRONMENT

TECHNICAL FIELD

Embodiments of the present invention relate to virtual machines. Specifically, embodiments of the invention relate to a method and system for providing a zero copy transmission in a virtualization environment.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (guest OS) and software applications (guest applications). Typically, a hypervisor, also known as a virtual machine monitor (VMM) or a host OS, manages allocation and virtualization of computer resources and performs context switching, as may be necessary, to cycle between various VMs. A host machine (e.g., computer or server) is typically enabled to simultaneously run multiple VMs, where each VM may be used by a remote client.

A guest application may issue numerous requests to send data over a network to a remote client or other destinations. Each of these requests is associated with significant overhead involving multiple copying of data (e.g., from a guest application memory to a guest operating system buffer and then to a hypervisor buffer). The above excessive data copying and context switching can be reduced using a mechanism known as "zero copy transmission." For example, one conventional zero copy transmission mechanism may allow a guest application to request transmission of data by issuing a map system call that asks the guest OS for a guest OS buffer. The guest OS reserves the buffer and returns to the guest application, which uses the guest OS buffer to store the data and then issues a system call. The system call invokes the networking stack engine in the guest OS to split the data into packets and attach headers to the data packets. The guest OS then tries to notify the network device driver about the data packets that need to be transmitted over a network. The hypervisor intercepts the request of the guest OS, copies the data packets into the hypervisor buffer, and notifies the guest OS that the data packets have been transmitted. The guest OS driver calls a packet destructor in the guest OS to free the guest OS buffer. The hypervisor then handles the data packets in its buffer.

While the above approach eliminates unnecessary data duplication within the VM, it still requires copying data from the guest OS buffer to the hypervisor buffer. In the host running multiple VMs, with each VM having multiple guest applications that send numerous requests to transmit data over a network, allocating a hypervisor buffer for each request of a guest application and copying data from a guest OS buffer to the hypervisor buffer create significant overhead and increase memory consumption. In addition, in order to perform networking stack processing, the guest OS has to be aware of hardware characteristics of a network device of the host machine, i.e., the guest OS has to be modified each time a network device is upgraded or added to the host machine.

Another existing zero copy transmission mechanism performs networking stack processing in the hypervisor, and not the guest OS, to avoid the necessity for the guest OS to be aware of hardware characteristics of a network device. However, such an approach still requires copying data from the guest OS buffer to the hypervisor buffer. In addition, performing networking stack processing for each data packet of a guest application overloads the hypervisor, negatively affecting its performance.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of a method and system for providing a zero copy transmission in virtualization environment are described herein. In one embodiment, a guest operating system (OS) provides networking stack processing for a guest application's data that should be transferred over a network via a host network device. The networking stack processing may include packetizing the data and attaching at least a partial (e.g., at least a data checksum) header to each data packet. The resulting data packet(s) may reside in a buffer of the guest application or a buffer of the guest OS. The guest OS then tries to notify a driver of the host network device about the data packet. The notification of the guest OS is intercepted by the hypervisor, which determines whether a zero copy transmission should be used for the data packet. If this determination is negative, the hypervisor copies the data packet to a hypervisor buffer, and notifies the driver of the host network device about the data packet residing in the hypervisor buffer. If the above determination is positive, the hypervisor does not copy the data packet to the hypervisor buffer but rather notifies the driver of the host network device about the data packet residing in the guest application buffer or the guest OS buffer. The driver then provides the data packet to the host network device, which transmits the data packet over the network.

Figure 1:
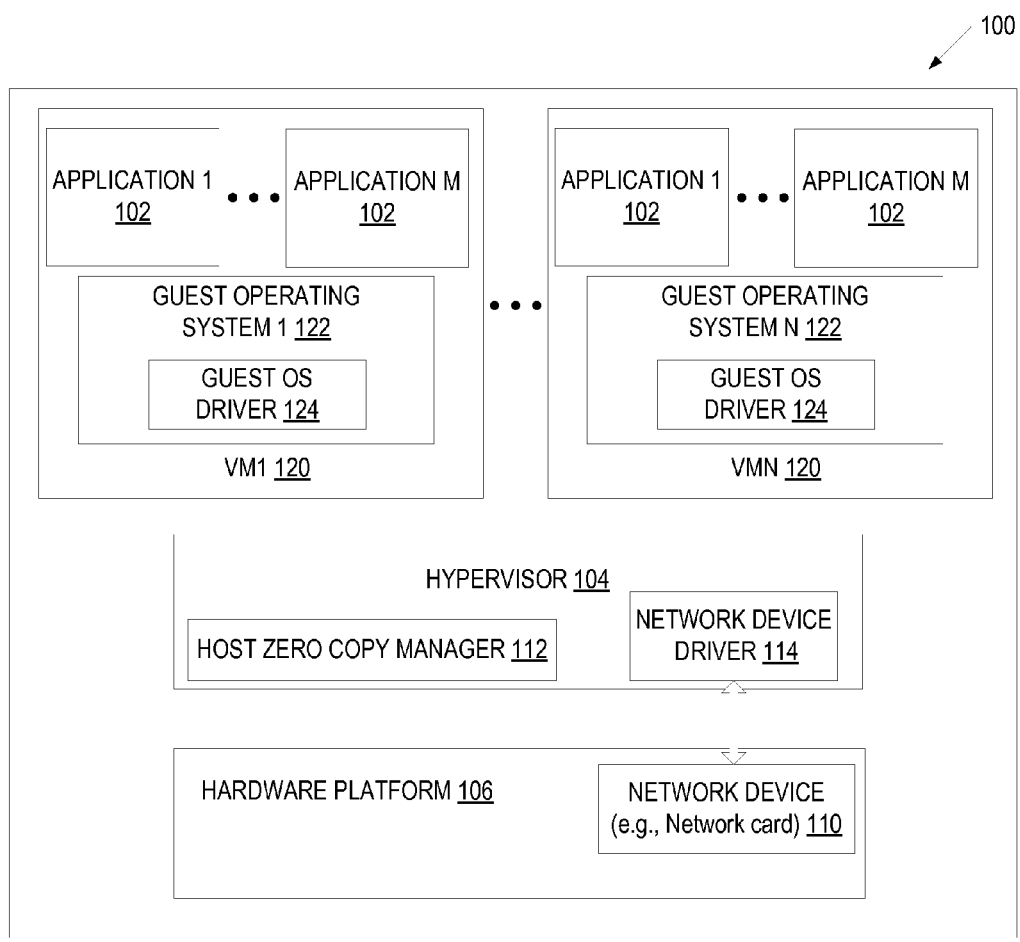
FIG. 1 is a block diagram of one embodiment of virtualization environment in which embodiments of the invention may be implemented.

FIG. 1 is a diagram of one embodiment of virtualization environment 100, in which embodiments of the present invention may be implemented. Virtualization environment 100 may be part of a host (a computing system such as a server computer, a gateway computer, etc.) that runs one or more virtual machines (VMs) 120. Each VM 120 runs a guest OS 122 that may be different from one another. The guest OS may include Microsoft Windows, Linux, Solaris, Mac OS, etc.

The host also includes a hypervisor 104 that emulates the underlying hardware platform for the VMs 120. The hypervisor 1104 may also be known as a virtual machine monitor (VMM), a kernel-based hypervisor or a host OS. In one embodiment, each VM 120 may be accessed by one or more of the clients over a network (not shown). The network may be a private network (e.g., a local area network (LAN), wide area network (WAN), intranet, etc.) or a public network (e.g., the Internet). In one scenario, the VM 120 provides a virtual desktop for the client.

Each guest OS 122 may run one or more applications 102 that create data that should be sent over a network (e.g., to corresponding clients or other destinations). The host includes a network device 110 that transmits data generated by the guest applications 102 over a network. The network device 110 may be a network card such as an Ethernet network card, a network interface controller (NIC), etc.

In one embodiment, when a guest application 102 generates data that needs to be transmitted over a network, the guest application 102 notifies the guest OS 122, which copies the data to a guest OS buffer and invokes networking stack processing, which involves packetizing the data, attaching at least a partial (e.g., at least a data checksum) header to each data packet, and storing the resulting data packet(s) in the guest OS buffer. In one embodiment, the networking stack processing is performed using a guest OS driver 124, which is configured to have substantially the same properties (e.g., packet size, packet format, etc.) as those of the network device 110.

In one embodiment, once the networking stack processing is completed, the guest OS 122 tries to send a request to the network device 110. However, because the guest OS is not allowed to access hardware resources of the host, the request of the guest OS 122 is intercepted by the host processor and forwarded to the hypervisor 104 or intercepted directly by the hypervisor 104. In one embodiment, the hypervisor 104 includes a host zero copy manager 112 that receives the request of the guest OS 122 and determines whether the data packet should be transmitted using a host-based zero copy approach that avoids copying the data packet into a hypervisor buffer. The host zero copy manager 112 makes this determination by querying a network device driver 114 on whether the network device 110 has a zero copy capability. The network device driver 114, which enables communication of the hypervisor 104 with the network device 110, can be part of the hypervisor 104 or an independent component. The network device 110 is considered to provide a zero copy capability if the network device 110 and the network device driver 114 can satisfy a set of conditions when instructed to perform a zero copy transmission. In one embodiment, the set of conditions includes a requirement for the network device 110 and/or the network device driver 114 to call a packet destructor within a small (predefined) time period after a data packet has been passed to the network device 110, and a requirement for the network device 110 and the network device driver 114 not to access data from the packet in the guest OS buffer after the packet destructor has been called. A packet destructor is a function that sends a signal to an entity (e.g., an application or an operating system) storing the packet data in memory to notify the entity that the associated memory can be reused. In one embodiment, the set of conditions also includes a requirement for the network device 110 to support access to data in arbitrary locations in memory (e.g., a gather list including references to different memory locations for data of a packet).

In one embodiment, the network device driver 114 includes a zero copy agent that responds to the query of the host zero copy manager 112. The network device driver 114 may include an indicator that specifies whether the network device 110 provides a zero copy capability. This indicator may be preprogrammed or set during system initialization. The zero copy agent 116 reads the value of the indicator and responds to the host zero copy manger 112 accordingly.

If the network device 110 does not provide a zero copy capability, the host zero copy manager 112 allocates a hypervisor buffer for the data packet, copies the data packet from the guest OS buffer to the hypervisor buffer, and notifies the network device driver 114 about the packet in the hypervisor buffer. After the host zero copy manager 112 copies the data packet to the hypervisor buffer, it notifies the guest OS that the data packet has been transmitted, which invokes the guest OS driver to call a packet destructor. The packet destructor signals to the guest OS that it can reuse the memory of the guest OS buffer.

If the network device 110 provides a zero copy capability, the host zero copy manager 112 does not copy the data packet to the hypervisor buffer, but rather notifies the network device driver 114 about the packet in the guest OS buffer. The network device driver 114 passes the data packet to the network device 110 and calls the packet destructor that signals to the guest OS 122 that it can reuse the memory of the guest OS buffer. As will be discussed in more detail below, in one embodiment, when the host zero copy manager 112 knows that the network device provides a zero copy capability, it performs an additional evaluation with respect to the data packet to determine whether a zero copy transmission is justified for the data packet. The additional evaluation may be based on characteristics of the data packet (e.g., the size of the packet, location of data fragments of the packet, content of the packet header, etc.) or other factors (e.g., whether portions of the packet require additional processing such as filtering, etc.). In an alternative embodiment, additional evaluation is performed by the zero copy agent 116 of the driver 114.

In an alternative embodiment, the guest OS 122 also provide a guest-based zero copy functionality. In particular, the guest OS 122 may include a library that performs networking stack processing for data stored in application memory. When a guest application 102 prepares data for transmission over a network, the guest application 102 stores the data in an application buffer and causes this data to go through networking stack processing (e.g., by issuing a system call that invokes the library providing networking stack processing). Once networking stack processing is completed, the guest OS 122 is notified about the resulting data packet in the guest application memory. The guest OS 122 then tries to send a request to the network device 110, which is intercepted by the host processor and forwarded to the hypervisor 104 or intercepted directly by the hypervisor 104. Upon receiving this request, the host zero copy manager 112 determines whether the data packet should be transmitted using a host-based zero copy approach that avoids copying the data packet into a hypervisor buffer. As discussed above, the host zero copy manager 112 makes this determination by querying the network device driver 114 on whether the network device 110 has a zero copy capability.

If the network device 110 does not provide a zero copy capability, the host zero copy manager 112 allocates a hypervisor buffer for the data packet, copies the data packet from the guest application buffer to the hypervisor buffer, and notifies the network device driver 114 about the packet in the hypervisor buffer. After the host zero copy manager 112 copies the data packet to the hypervisor buffer, it notifies the guest OS that the data packet has been transmitted, which invokes the guest OS driver to call a packet destructor. The packet destructor signals to the guest application 102 that it can reuse the memory of the guest application buffer.

If the network device 110 provides a zero copy capability, the host zero copy manager 112 does not copy the data packet to the hypervisor buffer, but rather notifies the network device driver 114 about the packet in the guest application buffer. The network device driver 114 passes the data packet to the network device 110 and calls a packet destructor that signals to the guest application 102 that it can reuse the memory of the guest application buffer.

Embodiments of the present invention improve the zero copy technique by keeping the networking stack operations in the guest OS, which is fully equipped to provide this functionality and does not require any modification for it. As a result, by adding the host zero copy manager 112 to the hypervisor 104 and configuring the guest OS driver 124 to resemble the host network device driver 114, a copy of a data packet from a guest OS buffer (or a guest application buffer) to a hypervisor buffer is eliminated and it is ensured that the guest OS 122 (or the guest application 102) does not reuse its buffer until the network device has queued the packet for transmission. In addition, embodiments of the present invention support both network devices that provide a zero copy capability and those that do not provide such a capability. Further, with embodiments of the present invention, a zero copy transmission can be applied only to some data packets and/or some portions of a data packet. Moreover, by facilitating data checksum calculations in the guest as opposed to the network device level, network devices that do not support transmission checksumming can still be used for a zero copy transmission.

Figure 2:
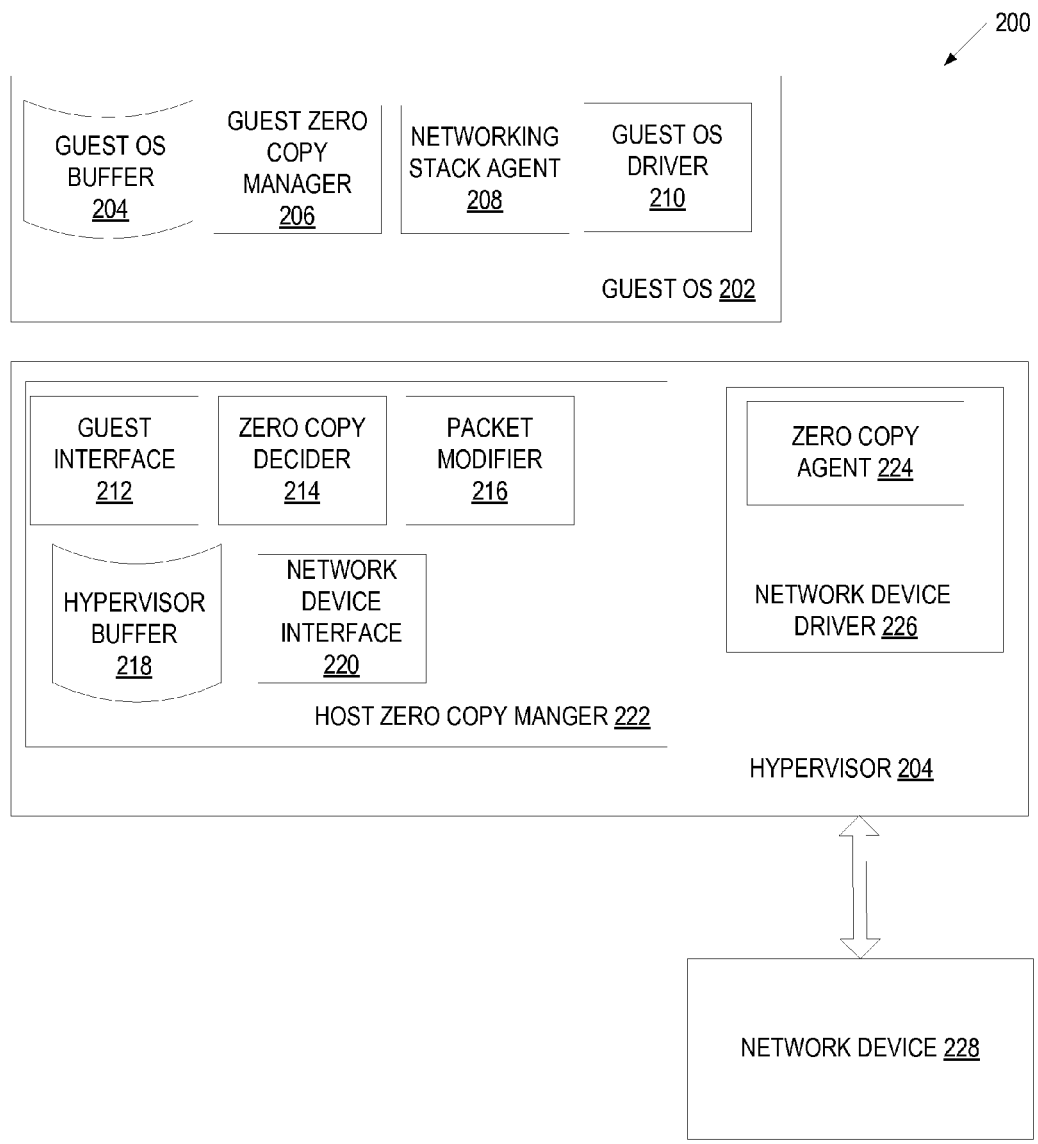
FIG. 2 is a block diagram of one embodiment of a zero copy transmission system.

FIG. 2 is a block diagram of one embodiment of a zero copy transmission system 200. The system 200 has a guest OS 202 and a hypervisor 204. The guest OS 202 includes a guest zero copy manager 206, a networking stack agent 208 and a guest OS driver 210. The hypervisor 204 includes a host zero copy manager 222 which may have a guest interface 212, a zero copy decider 214, a packet modifier 216 and a network device interface 220. In addition, the hypervisor includes a network device driver 226 which may have a zero copy agent 224. The network device driver 226 communicates with a network device 228.

In one embodiment, the hypervisor 204 (e.g., the network device interface 220) requests the network device driver 226 to provide properties of the network device 228 such as the packet size used by the network device 228, the packet format used by the network device 228, etc. Upon receiving the properties (e.g., via the network device interface 220), the hypervisor communicates these properties to the guest OS (e.g., via the guest interface 212), which then configures the guest OS driver 210, based on these properties, to resemble the network device driver 226. The hypervisor 204 may request properties of the network device 228, each time the host is initialized, when the network device 228 is added or modified, or at any other point in time.

Further, when a guest application prepares data for transmission over a network, the guest application, in one embodiment, notifies the guest zero copy manager 206, which copies the data to a guest OS buffer 204 and invokes the networking stack agent 208 to packetize the data and attach at least a partial (e.g., at least a data checksum) header to each data packet. Each header may include all header data required for transmission by networking protocols or only partial data. In one embodiment, each header includes at least a transmission checksum. In one embodiment, the networking stack agent 208 also creates a gather list for the data packet. The gather list identifies memory locations storing data of the packet. The networking stack processing is performed using the guest OS driver 210, which is configured to have substantially the same properties (e.g., packet size, packet format, etc.) as those of the network device 228. The guest zero copy manager 206 then tries to send a request to the network device 228, which is intercepted and received by the guest interface 212 of the hypervisor 204.

In another embodiment, the guest OS 202 also provide a guest-based zero copy functionality. In particular, the guest zero copy manager 206 includes a library that performs networking stack processing for data stored in application memory. When a guest application prepares data for transmission over a network, the guest application stores the data in an application buffer (not shown) and causes this data to go through networking stack processing (e.g., by issuing a system call that invokes the library providing networking stack processing). Once networking stack processing is completed, the guest zero copy manager 206 is notified about the resulting data packet in the guest application buffer. The guest zero copy manager 206 then tries to send a request to the network device 228, which is intercepted and received by the guest interface 212 of the hypervisor 204.

In either embodiment, when the guest OS request is received by the guest interface 212, the zero copy decider 214 is invoked to determine whether the data packet should be transmitted using a host-based zero copy approach that avoids copying the data packet into a hypervisor buffer. This determination is made by querying the zero copy agent 224 in the network device driver 226 on whether the network device 228 has a zero copy capability. As discussed above, a network device is considered to provide a zero copy capability if the network device and/or the network device driver can call a packet destructor within a small (predefined) time period after a data packet has been passed to the network device, and the network device and the network device can refrain from accessing data from the packet in a guest OS or application buffer after the packet destructor has been called. In one embodiment, the set of conditions also includes a requirement for the network device to support access to data in arbitrary locations in memory (e.g., a gather list including references to different memory locations for data of a packet).

The zero copy agent 224 of the network device driver 226 responds to the query of the host zero copy manager 222 by, for example, reading the value of an indicator stored in the network device driver 226 that specifies whether the network device 228 provides a zero copy capability.

If the network device 228 does not provide a zero copy capability, the host zero copy manager 222 allocates a hypervisor buffer 218 for the data packet, copies the data packet from the guest OS buffer 204 (or guest application buffer) to the hypervisor buffer 218, and notifies (e.g., via the network device interface 220) the network device driver 228 about the packet in the hypervisor buffer 218. After the host zero copy manager 222 copies the data packet to the hypervisor buffer 218, it notifies the guest OS 202 that the data packet has been transmitted, which invokes the guest OS driver 210 to call a packet destructor. The packet destructor signals to the guest OS or the guest application that it can reuse the memory of the guest OS buffer 204 (or the guest application buffer).

If the network device 228 provides a zero copy capability, the zero copy decider 214 pins down the guest OS buffer 204 (or guest the application buffer) and attaches to the packet a flag indicating that a zero copy transmission is being used, and a packet destructor function to be called when the data packet has been queued for transmission. In addition, in one embodiment, the zero copy decider 214 also attaches to the packet a context pointer that identifies an entity (e.g., guest OS 202 or guest application) which needs to be notified when the guest OS buffer 204 (or application buffer) is unpinned. In one embodiment, the zero copy decider 214 limits the amount of memory pinned. In particular, before the zero copy decider 214 pins down the memory, it determines whether the amount of pinned memory exceeds a predefined threshold. If so, in some embodiments, the zero copy decider 214 does not accept the packet from the guest OS 202, generating an error message in response to the guest OS request pertaining to the data packet. In other embodiments, the zero copy decider 214 processes the packet until the amount of pinned memory becomes smaller, or decides that a zero copy transmission should not be used and copies the data packet from the guest OS buffer 204 (or a guest application buffer) a hypervisor buffer 218.

Further, if the data packet has been handled using a zero copy transmission, the network device interface 220 notifies the network device driver 226 about the data packet residing in the guest OS buffer 204 (or guest application buffer). In particular, in one embodiment, the network device interface 220 sends the gather list of the data packet to the network device driver 226. The network device driver 226 passes the gather list to the network device 228 which reads the data packet from the guest OS buffer 204 (or guest application buffer) and queues the data packet for transmission. Next, the network device driver 226 calls the packet destructor that signals to the guest OS 202 or the guest application that it can reuse its buffer.

In one embodiment, when the zero copy decider 214 knows that the network device 228 provides a zero copy capability, it performs an additional evaluation with respect to the data packet to determine whether a zero copy transmission is justified for the data packet. The additional evaluation may be based on characteristics of the data packet (e.g., the size of the packet, location of data fragments of the packet, content of the packet header, etc.) or other factors (e.g., whether portions of the packet require additional processing such as filtering, etc.). If portions of the data packet require additional processing, the packet modifier 216 is invoked to perform the required processing. In an alternative embodiment, additional evaluation is performed by the zero copy agent 224 of the network device driver 226.

Figure 3A:
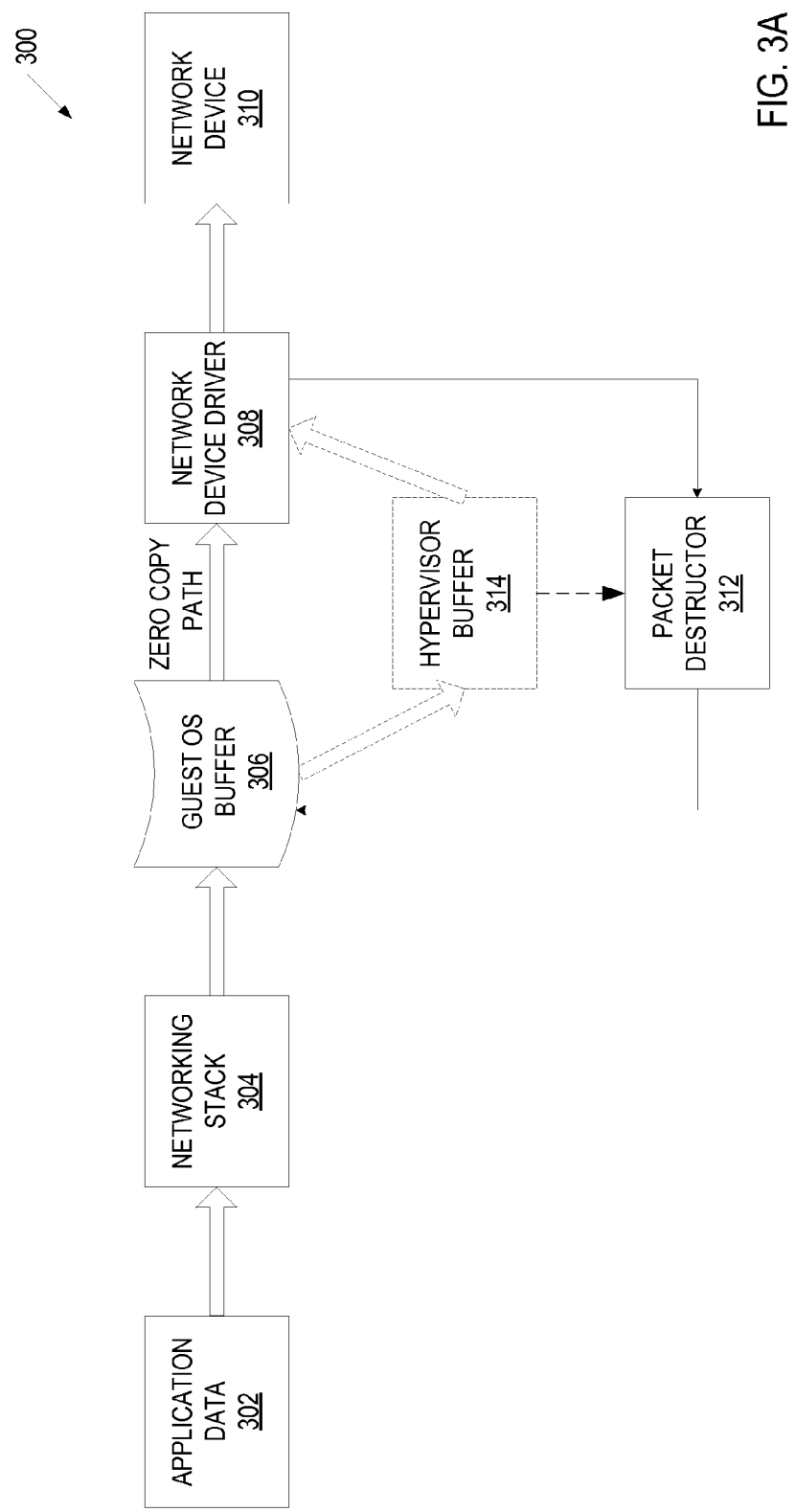
FIGS. 3A and 3B illustrate a zero copy transmission in virtualization environment, in accordance with alternative embodiments.
Figure 3B:
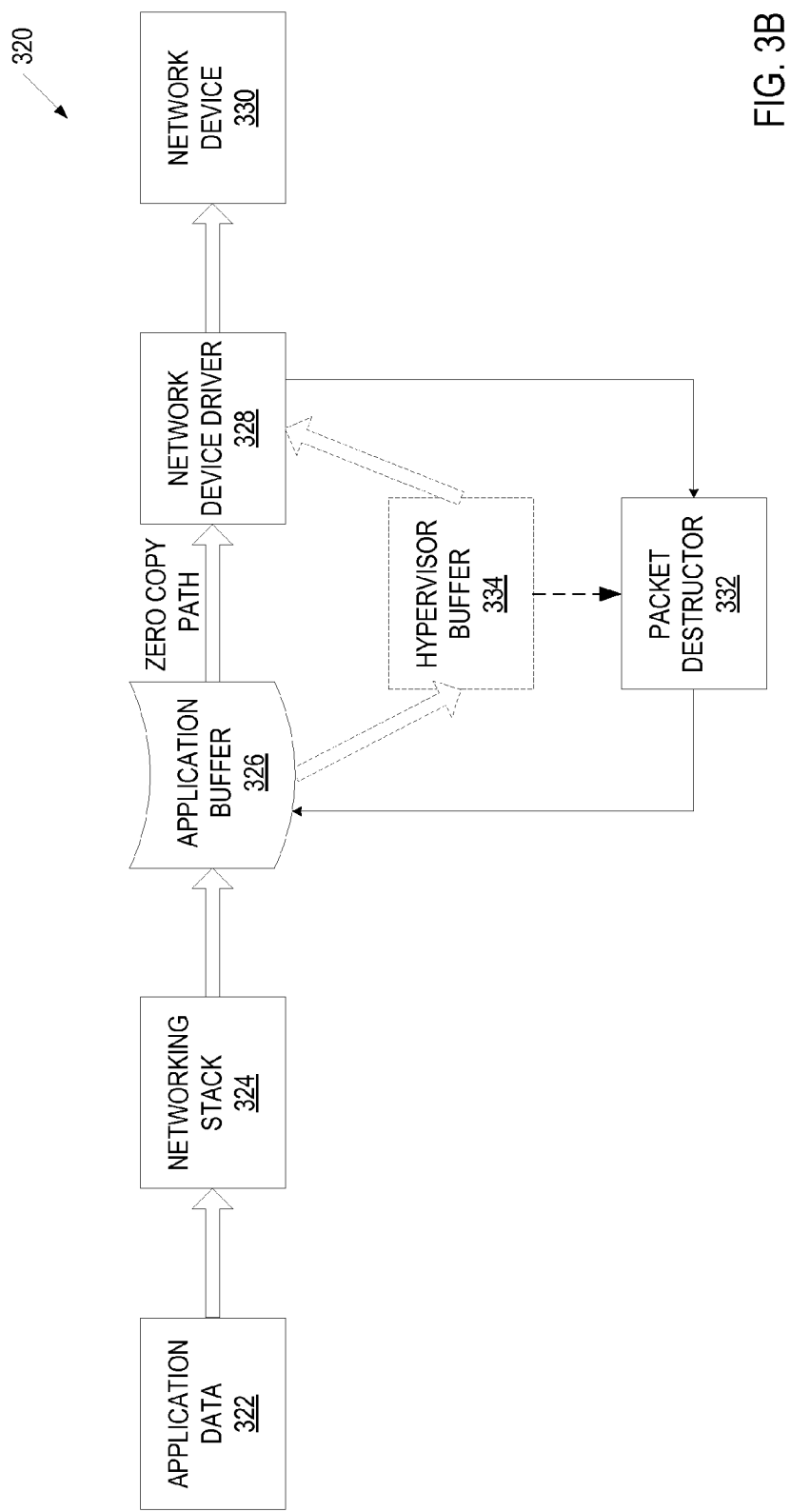

FIGS. 3A and 3B illustrate a zero copy transmission in virtualization environment, in accordance with alternative embodiments. In particular, FIG. 3A illustrates a host-based zero copy transmission utilizing data in a guest OS buffer, according to some embodiments. FIG. 3B illustrates a host-based zero copy transmission utilizing data in a guest application buffer, according to other embodiments.

Referring to FIG. 3A, an application stores data that needs to be transmitted over a network in application memory 302, and performs a system call to notify the guest OS about the data. The guest OS copies the application data to a guest OS buffer 306, and invokes networking stack processing 304, which stores the resulting data packet(s) in the guest OS buffer 306. The networking stack processing also creates a gather list for the data packet. Next, the guest OS issues a request to transmit a data packet over a network. The request may include a gather list of the data packet.

The hypervisor intercepts the request and determines whether the data packet should be transmitted using a zero copy transmission. If the data packet should be transmitted using a zero copy transmission, the hypervisor pins down the guest OS buffer 306 and attaches to the packet a flag indicating that a zero copy transmission is being used, and a packet destructor function to be called when the data packet has been queued for transmission. In addition, in one embodiment, the hypervisor also attaches to the packet a context pointer that identifies an entity (e.g., the guest OS) which needs to be notified when the guest OS buffer 306 is unpinned. In one embodiment, the hypervisor limits the amount of memory pinned as discussed above.

Further, the hypervisor notifies the network device driver 308 about the data packet residing in the guest OS buffer 306. In particular, in one embodiment, the hypervisor sends the gather list of the data packet to the network device driver 308. The network device driver 308 passes the gather list to the network device 310 which reads the data packet from the guest OS buffer 306 and queues the data packet for transmission. The network device driver 308 then calls a packet destructor. The packet destructor signals to the guest OS that it can reuse the memory of the guest OS buffer 306.

If a zero copy transmission should not be used for transmitting the data packet, the hypervisor copies the data packet from the guest OS buffer 306 to a hypervisor buffer 314, notifies the guest OS that the data packet has been transmitted, and notifies the network device driver 308 about the data packet residing in the hypervisor buffer 314. The guest OS driver calls the packet destructor 312 that signals to the guest OS that it can reuse the memory of the guest OS buffer 306.

Referring to FIG. 3B, a guest application requests networking stack processing for data 322 that needs to be transmitted. In one embodiment, the guest OS includes a library that provides networking stack processing, and the guest application sends a request for networking stack processing to the guest OS which provides the library to perform the networking stack functionality. In particular, the library includes functionality that splits data into packets and attaches headers to the packets. Each header may include all header data required for transmission by networking protocols or only partial data. In one embodiment, each header includes at least a transmission checksum. The resulting data packet(s) are stored in the guest application buffer 326. In one embodiment, the networking stack processing also creates a gather list for the data packet. The gather list identifies memory locations storing data of the packet.

The guest application issues a request to the guest OS to transmit a data packet over a network. The request may include a gather list of the data packet and may be issued via a system call that conventionally results in copying data from the guest application memory to the guest OS buffer.

Hence, the guest application does not reuse the guest application buffer 326 until it receives a signal that the copying has been completed.

When the guest OS is notified about the data packet, the guest OS issues a request to transmit a data packet over a network. The request may include a gather list of the data packet.

The hypervisor intercepts the request and determines whether the data packet should be transmitted using a zero copy transmission. If the data packet should be transmitted using a zero copy transmission, the hypervisor pins down the guest application buffer 326 and attaches to the packet a flag indicating that a zero copy transmission is being used, and a packet destructor function to be called when the data packet has been queued for transmission. In addition, in one embodiment, the hypervisor also attaches to the packet a context pointer that identifies an entity (e.g., the guest application) which needs to be notified when the guest application buffer 326 is unpinned. In one embodiment, the hypervisor limits the amount of memory pinned as discussed above.

Further, the hypervisor notifies the network device driver 308 about the data packet residing in the guest application buffer 326. In particular, in one embodiment, the hypervisor sends the gather list of the data packet to the network device driver 328. The network device driver 328 passes the gather list to the network device 330 which reads the data packet from the guest application buffer 326 and queues the data packet for transmission. The network device driver 328 then calls the packet destructor 332 that signals to the guest application that it can reuse the memory of the guest application buffer 326.

If a zero copy transmission should not be used for transmitting the data packet, the hypervisor copies the data packet from the guest application buffer 326 to a hypervisor buffer 334, notifies the guest OS, and notifies the network device driver 328 about the data packet residing in the hypervisor buffer 334. The guest OS invokes the guest OS driver to call the packet destructor 332 that signals to the application that it can reuse the memory of the guest application buffer 326.

Figure 4:
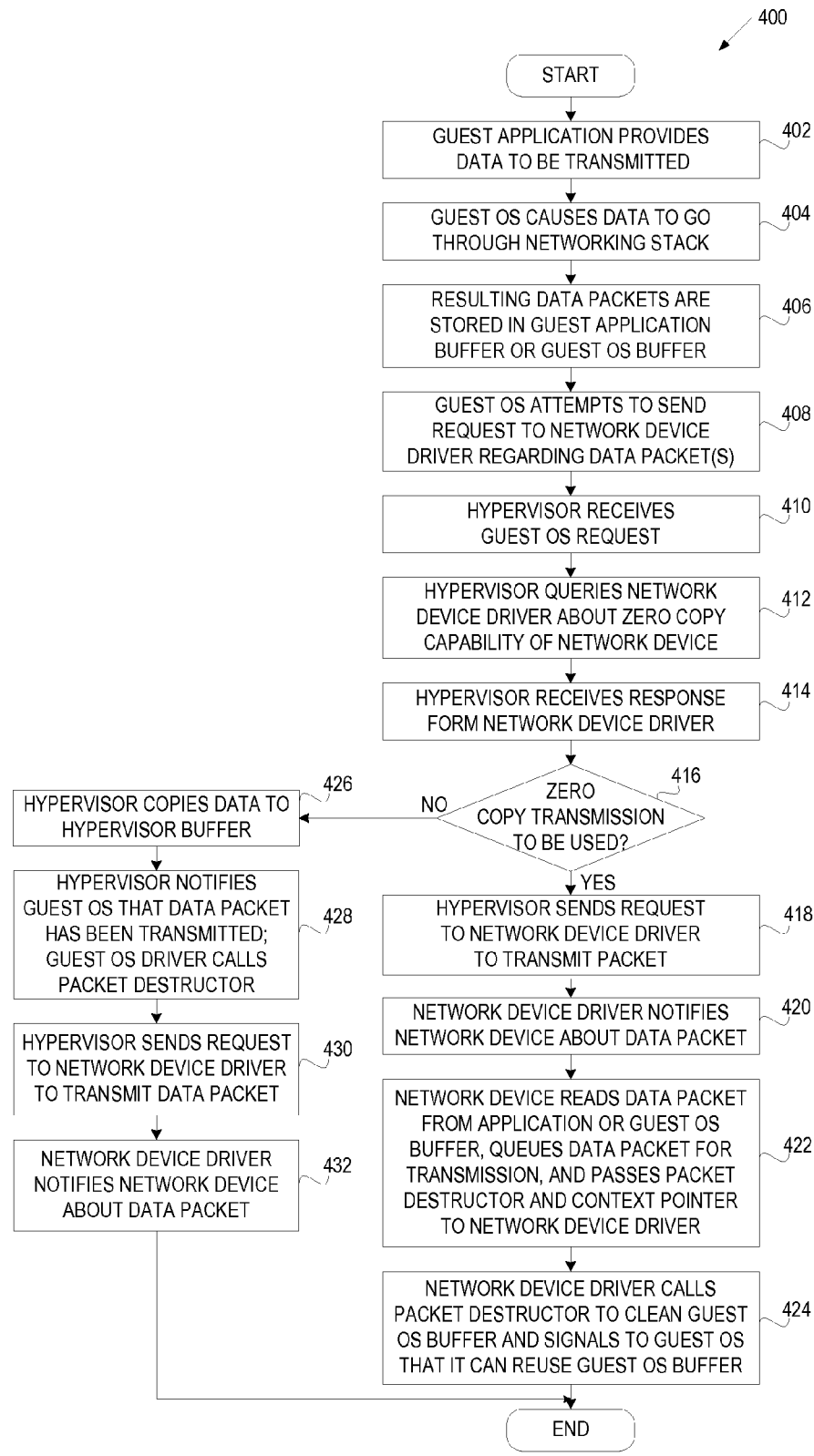
FIG. 4 is a flow diagram of one embodiment of a method for providing a zero copy transmission in virtualization environment.

FIG. 4 is a flow diagram of one embodiment of a method 400 for providing a zero copy transmission in virtualization environment. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by a computing system (e.g., a computer system providing a virtualization environment 100 of FIG. 1).

Referring to FIG. 4, method 400 begins with an application providing data that needs to be transmitted over a network (block 402). At block 404, the guest OS causes this data to go through networking stack processing. The networking stack processing may include packetizing the data and attaching at least a partial (e.g., at least a data checksum) header to each data packet. The networking stack processing is performed using a guest OS drover configured to resemble a driver of a host network device. In one embodiment, the networking stack processing also involves creating a gather list specifying memory locations of data of the packet.

At block 406, the resulting data packet(s) are stored in the guest OS buffer or the guest application buffer. At block 408, the guest OS attempts to send a request to the network device to transmit the data packet over a network. At block 410, the guest OS request is intercepted and received by the hypervisor. At block 412, the hypervisor queries a network device driver on whether the network device has a zero copy capability. The network device is considered to provide a zero copy capability if it can satisfy a set of conditions when instructed to perform a zero copy transmission. In one embodiment, the set of conditions includes a requirement to call a packet destructor within a small (predefined) time period after a data packet has been passed to the network device for transmission, and a requirement not to access data from the packet after the packet destructor has been called. In one embodiment, the set of conditions also includes a requirement for the network device to support a gather list including references to different memory locations for data of the packet.

At block 414, the hypervisor receives a query response from the network device driver. Based on the query response, the hypervisor determines whether a zero copy transmission should be used for the data packet (block 416). In particular, if the network device does not provide a zero copy capability, the hypervisor decides that a zero copy transmission should not be used for the data packet. If the network device provides a zero copy capability, the hypervisor may either decide to use a zero copy transmission for the data packet, or it may perform additional evaluation with respect to the data packet to determine whether a zero copy transmission is justified for the data packet. The additional evaluation may be based on characteristics of the data packet (e.g., the size of the packet, location of data fragments of the packet, content of the packet header, etc.) or other factors (e.g., whether portions of the packet require additional processing such as filtering, etc.). In an alternative embodiment, additional evaluation is performed by the network device driver.

If a zero copy transmission should not be used, the hypervisor allocates a hypervisor buffer for the data packet, and copies the data packet from the guest OS or application buffer to the hypervisor buffer (block 426). At block 428, the hypervisor notifies the guest OS that the data packet has been transmitted. The guest OS invokes the guest OS driver that calls a packet destructor to signal to the guest OS or application that it can reuse the memory of the guest OS or application buffer. At block 430, the hypervisor notifies the network device driver about the packet in the hypervisor buffer. At block 432, the network device driver provides the data packet to the network device.

If a zero copy transmission should be used for the packet, the hypervisor does not copy the packet to the hypervisor buffer, but rather notifies the network device driver about the packet in the guest OS or application buffer (e.g., by sending a gather list of the packet to the network device driver) (block 418). In one embodiment, the hypervisor attaches to the packet an indicator of a zero copy transmission, a packet destructor function, and optionally a context pointer. At block 420, the network device driver passes the data packet to the network device which queues the data packet for transmission. At block 422, the network device reads the data packet from the guest OS or application buffer queues the data packet for transmission and passes the packet destructor and the context pointer to the network device driver. At block 424, the network device driver calls the packet destructor which signals to the application that it can reuse the application memory.

Figure 5:
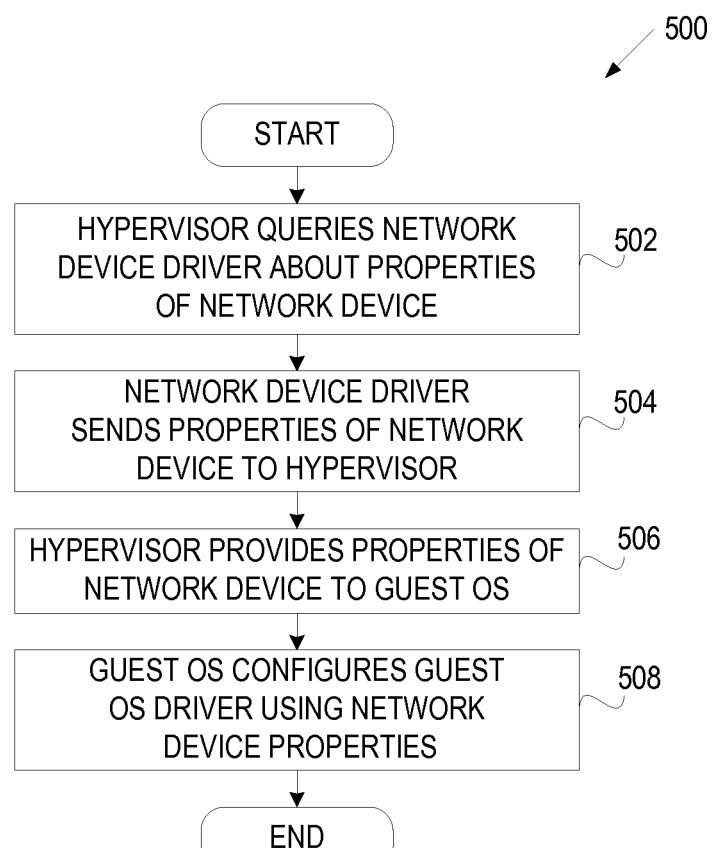
FIG. 5 is a flow diagram of one embodiment of a method for configuring a driver of a guest operating system.

FIG. 5 is a flow diagram of one embodiment of a method 500 for configuring a guest OS driver. The method 500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 500 is performed by a computing system (e.g., a computer system providing a virtualization environment 100 of FIG. 1).

Referring to FIG. 5, method 500 begins with the hypervisor querying the network device driver about properties of the network device such as the packet size used by the network device, the packet format used by the network device, etc. The hypervisor may request properties of the network device each time the host is initialized, when the network device 228 is added or modified, or at any other point in time.

At block 504, the network device driver provides the properties of the network device to the hypervisor. At block 506, the hypervisor communicates these properties to the guest OS. At block 508, the guest OS configures the guest OS driver based on these properties, to resemble the network device driver.

FIGS. 6 through 9 are flow diagrams of various embodiments of a method for performing additional analysis in relation to a zero copy transmission. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by a hypervisor (e.g., the hypervisor 104 of FIG. 1).

Figure 6:
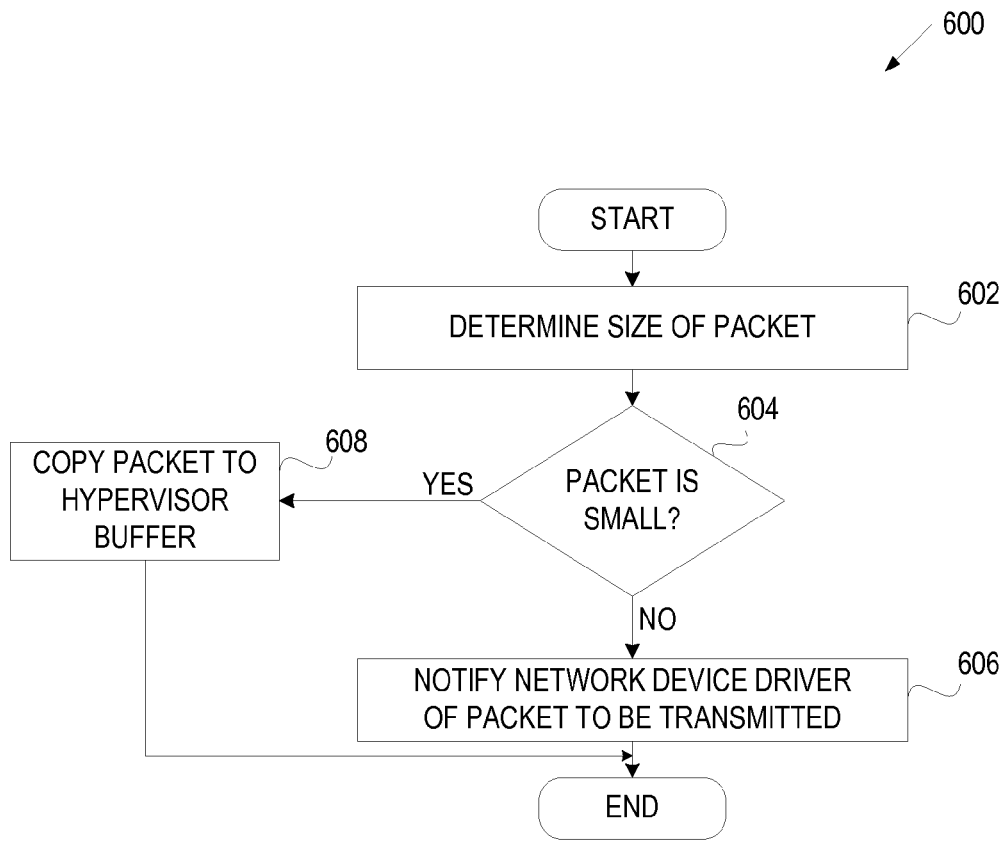
FIG. 6 is a flow diagram of one embodiment of a method for selectively providing a zero copy transmission based on the size of data packets.

FIG. 6 is a flow diagram of one embodiment of a method 600 for selectively providing a zero copy transmission based on the size of data packets. Method 600 starts after the hypervisor receives a query response from the network device driver, indicating that the network device has a zero copy capability. Upon receiving this response, the hypervisor determines the size of the packet (block 602). If the size of the packet is too small (below a predefined threshold) (block 604), the hypervisor decides that the zero copy transmission is not justified, copies the packet to the hypervisor buffer (block 608), and notifies the guest OS that the data packet has been transmitted. The operating system may then wait for other small data packets of the application, and notify the network device driver about the accumulated small packets stored in the hypervisor buffer.

If the current data packet is medium or large (i.e., its size exceeds a predefined threshold), the hypervisor decides that a zero copy transmission is justified and notifies the network device driver of the packet in the guest OS or application buffer (block 406). As discussed above, in one embodiment, the hypervisor attaches to the packet an indicator of a zero copy transmission, a packet destructor function, and optionally a context pointer. The network device driver passes the data packet to the network device for transmission and calls the packet destructor.

Figure 7:
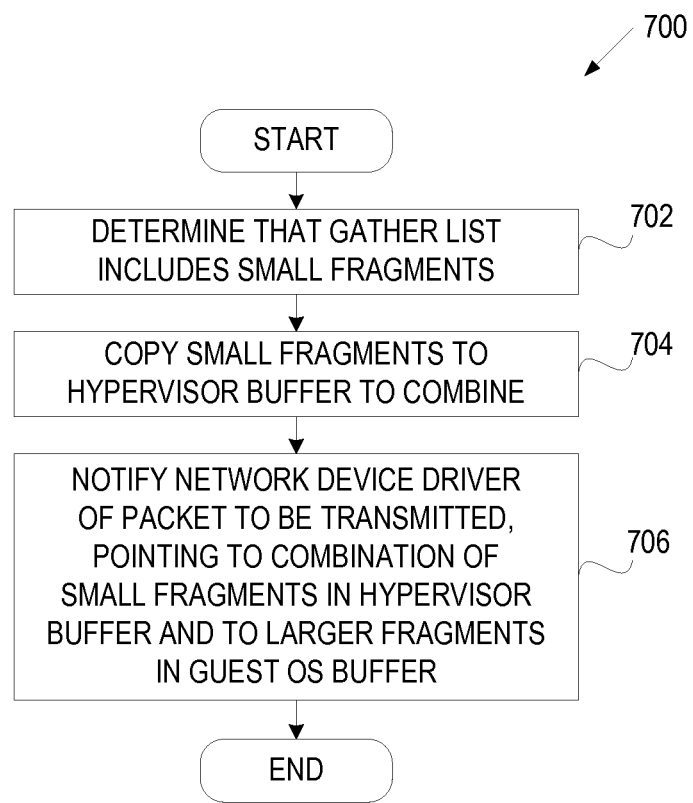
FIG. 7 is a flow diagram of one embodiment of a method for selectively providing zero copy transmission based on a gather list of a data packet.

FIG. 7 is a flow diagram of one embodiment of a method for selectively providing a zero copy transmission based on a gather list of a data packet. Method 700 starts after the hypervisor receives a query response from the network device driver, indicating that the network device has a zero copy capability. Upon receiving this response, the hypervisor determines that the gather list of the packet refers to a significant number of small data fragments (block 702). Based on this determination, the hypervisor decides that a zero copy transmission is justified only for larger fragments of the data packet. In particular, the hypervisor copies the small fragments to the hypervisor buffer (block 704), and notifies the network device driver about the data packet, providing references to larger (bigger than a predefined threshold) packets residing in the guest OS or application buffer and a reference to a collection of small fragments residing in the hypervisor buffer (block 706). In addition, the hypervisor attaches to the packet an indicator of a zero copy transmission, a packet destructor function, and optionally a context pointer. The network device driver passes the data packet to the network device to be queued for transmission and calls the packet destructor.

Figure 8:
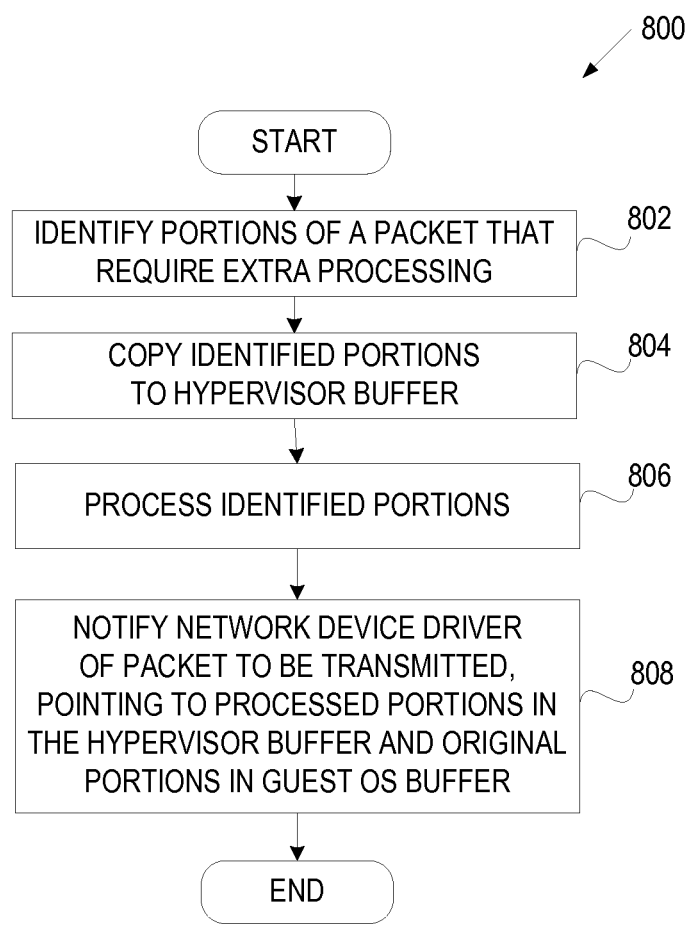
FIG. 8 is a flow diagram of one embodiment of a method for selectively providing a zero copy transmission based on need for extra processing of data within a data packet.

FIG. 8 is a flow diagram of one embodiment of a method 800 for selectively providing a zero copy transmission based on need for extra processing of data within a data packet. Method 800 starts after the hypervisor receives a query response from the network device driver, indicating that the network device has a zero copy capability. Upon receiving this response, the hypervisor determines that certain portions of a data packet require additional processing (e.g., filtering for data security) (block 802). Based on this determination, the hypervisor decides that a zero copy transmission is justified only for packet data that does not require additional processing. In particular, the hypervisor copies the portions of the packet that require additional processing to a hypervisor buffer (block 804), and causes the copied portions of the packet to be processed as required (block 806). Then, the hypervisor notifies the network device driver about the data packet, providing a reference to the processed data residing in the hypervisor buffer and references to the other packet data residing in the guest OS or application buffer (block 808). In addition, the hypervisor attaches to the packet an indicator of a zero copy transmission, a packet destructor function, and optionally a context pointer. The network device driver passes the data packet to the network device to be queued for transmission and calls the packet destructor.

Figure 9:
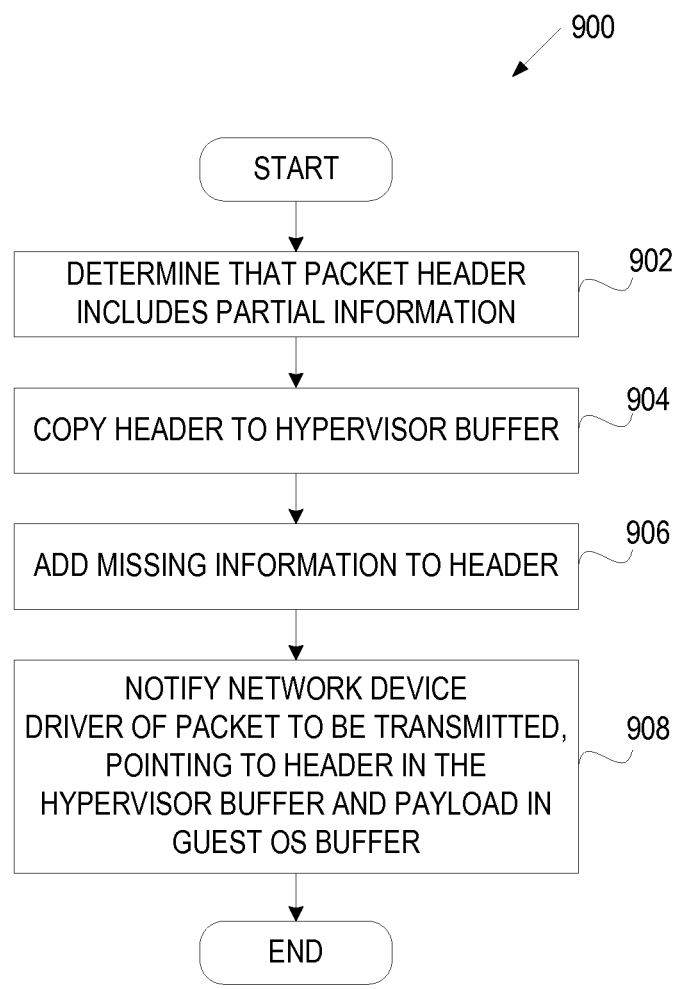
FIG. 9 is a flow diagram of one embodiment of a method for selectively providing a zero copy transmission based on an incomplete header of a data packet.

FIG. 9 is a flow diagram of one embodiment of a method 900 for selectively providing a zero copy transmission based on an incomplete header of a data packet. Method 900 starts after the hypervisor receives a query response from the network device driver, indicating that the network device has a zero copy capability. Upon receiving this response, the hypervisor determines that the header of the data packet is incomplete (e.g., includes only a transmission checksum) (block 902). Based on this determination, the hypervisor decides that a zero copy transmission is justified for the payload of the packet but not the header of the packet. The hypervisor then copies the header of the packet to a hypervisor buffer (block 904), and adds missing information to the header of the packet (block 906). Then, the hypervisor notifies the network device driver about the data packet, providing a reference to the header in the hypervisor buffer and references to the payload data residing in the guest OS or application buffer (block 908). In addition, the hypervisor attaches to the packet an indicator of a zero copy transmission, a packet destructor function, and optionally a context pointer. The network device driver passes the data packet to the network device for transmission and calls the packet destructor.

Figure 10:
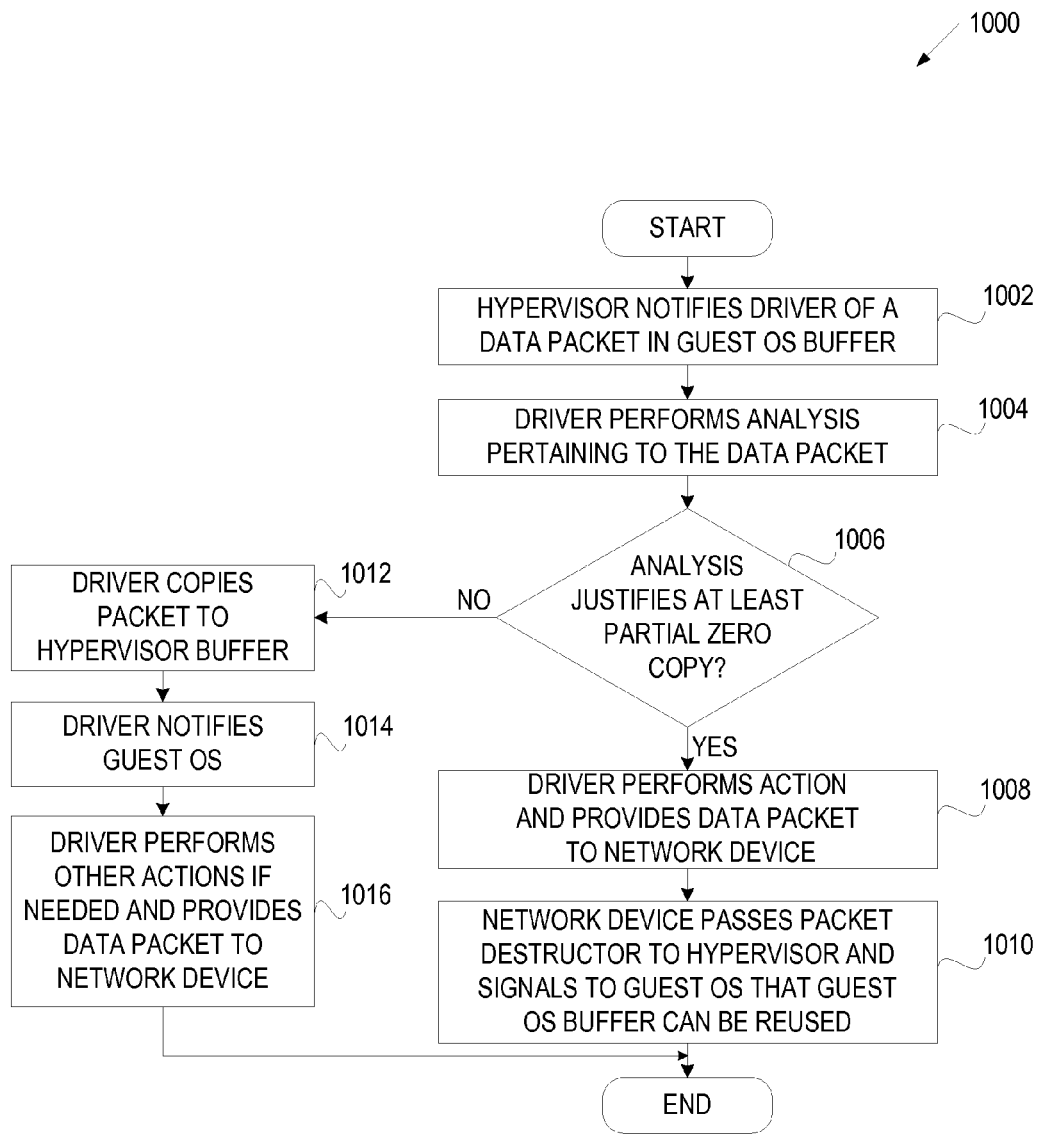
FIG. 10 is a flow diagram of one embodiment of a method for selectively providing a zero copy transmission by a network device driver.

FIG. 10 is a flow diagram of one embodiment of a method 1000 for selectively providing a zero copy transmission by a network device driver. The method 1000 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method is performed by a network device driver (e.g., network device driver 114 of FIG. 1).

Referring to FIG. 10, method 1000 begins when the hypervisor notifies the network device driver about a data packet residing in the guest OS or application buffer (block 1002). At block 1004, the network device driver performs analysis similar to any of those performed by the hypervisor that are discussed in more detail above in conjunction with FIGS. 6 through 9. For example, the network device driver may evaluate the size of the data packet, the gather list of the data packet, whether additional processing (e.g., filtering) is required for portions of the data packet, whether the header of the data packet includes incomplete information, etc.

At block 1006, the network device driver decides whether the analysis justifies at least partial zero copy transmission. If so, the network device driver performs required actions (e.g., partial copying, filtering, addition of header data, etc.) on the packet and passes the packet to the network device (block 1008). The network device driver then call the packet destructor, which signals to the guest OS or application that its buffer can be reused.

If the network device driver decides that the analysis does not justify any zero copy transmission, the network device driver copies the packet to the hypervisor buffer (block 1012) and notifies the guest OS that the packet has been transmitted (block 1014), which causes the guest OS driver to call the packet destructor that signals to the guest OS or application that its buffer can be reused. The network device then performs other actions (e.g., data filtering) if needed and provides the data packet to the network device (block 1016).

Figure 11:
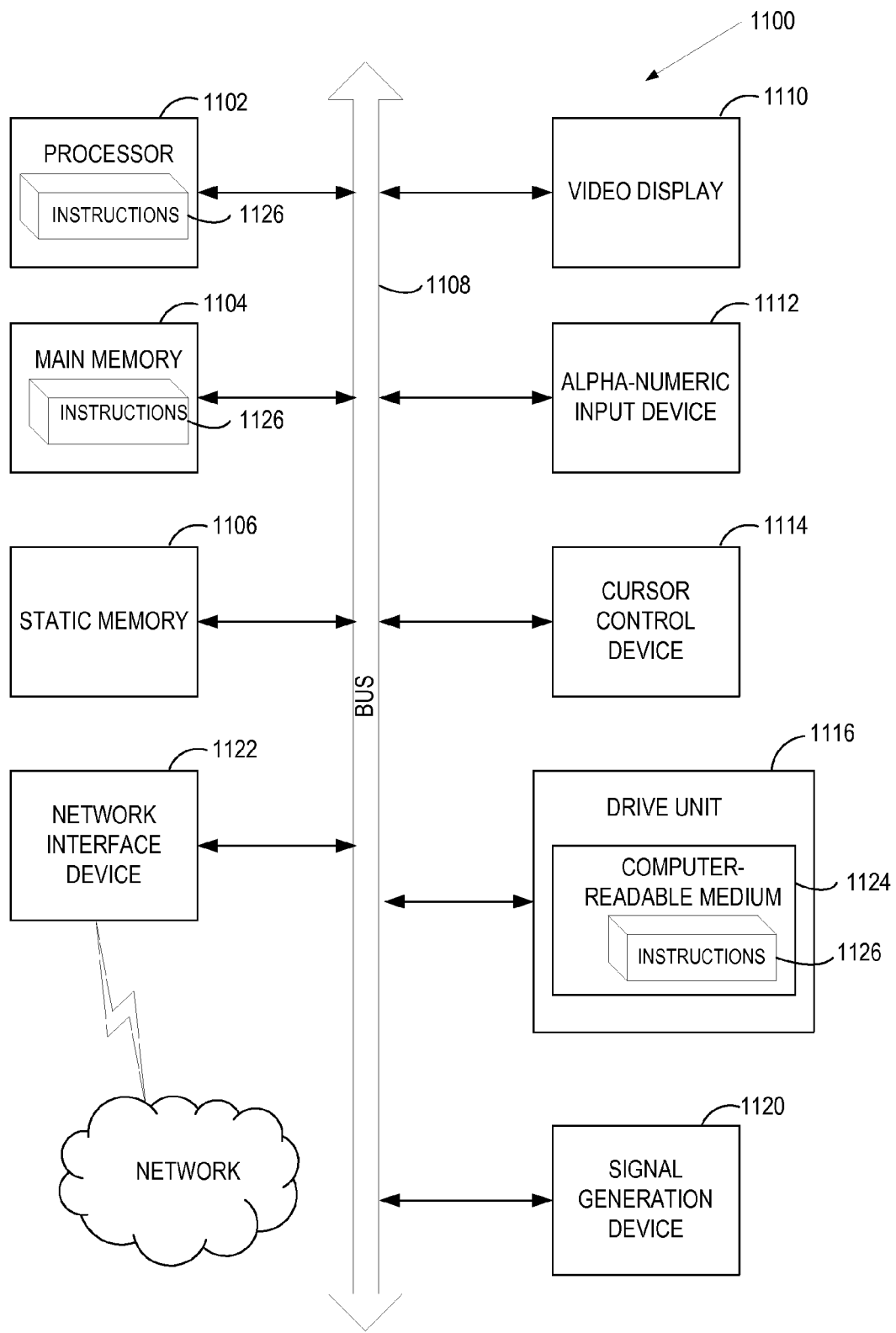
FIG. 11 is a block diagram of one embodiment of a computing system providing a zero copy transmission in virtualization environment.

FIG. 11 is a block diagram of one embodiment of a computing system providing a zero copy transmission with raw packets. Within the computing system 1100 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computing system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a secondary memory 1116 (e.g., a data storage device in the form of a drive unit, which may include fixed or removable computer-readable storage medium), which communicate with each other via a bus 1108.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. Processing device 1102 is configured to execute instructions 1126 (e.g., zero copy transmission system 200 of FIG. 2) for performing the operations and steps discussed herein.

The computer system 1100 may further include a network device 110 (e.g., NIC, Ethernet network card, etc.). The computer system 1100 also may include a video display unit 1110 (e.g., a liquid crystal display (LCD) or a cathode ray tube (CRT)) connected to the computer system through a graphics port and graphics chipset, an alphanumeric input device 1112 (e.g., a keyboard), a cursor control device 1114 (e.g., a mouse), and a signal generation device 1120 (e.g., a speaker).

The secondary memory 1116 may include a machine-readable storage medium (or more specifically a computer-readable storage medium) 1124 on which is stored one or more sets of instructions (e.g., zero copy transmission system 200 of FIG. 2) embodying any one or more of the methodologies or functions described herein. The instructions 1126 (e.g., zero copy transmission system 200 of FIG. 2) may also reside, completely or at least partially, within the main memory 1104 and/or within the processing device 1102 during execution thereof by the computer system 1100, the main memory 1104 and the processing device 1102 also constituting machine-readable storage media. The instructions 1126 (e.g., zero copy transmission system 200 of FIG. 2) may further be transmitted or received over a network 1118 via the network device 110.

The computer-readable storage medium 1124 may also be used to store the instructions 1126 (e.g., zero copy transmission system 200 of FIG. 2) persistently. While the computer-readable storage medium 1126 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The components and other features described herein (for example in relation to FIG. 2) can be implemented as discrete hardware components or integrated in the functionality of hardware components such as ASICS, FPGAs, DSPs or similar devices. In addition, these components can be implemented as firmware or functional circuitry within hardware devices. Further, these components can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "querying," "determining," "notifying," "copying," "generating," "transmitting" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for providing a zero copy transmission with raw packets has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
receiving, by a hypervisor of a host computing system, a first request of a first guest operating system (OS) to send a first data packet associated with a first guest application to a first network device driver of a first network device for transmission over a network, the first data packet having gone through networking stack processing performed by the first guest OS, the first data packet residing in a buffer of the first guest OS or a buffer of the first guest application and having at least a partial header created during the networking stack processing;
allocating a hypervisor buffer accessible by the hypervisor but not the first guest OS or a second guest OS;
in response to the first request of the first guest OS, querying, by a processing device executing the hypervisor, the first network device driver on whether the first network device has a zero copy capability;
responsive to receiving a response from the first network device driver that the first network device has the zero copy capability:
 refraining from copying the first data packet to the hypervisor buffer; and
 notifying, by the hypervisor, the first network device driver about the first data packet residing in the buffer of the first guest OS or the buffer of the first guest application to cause the first data packet to be retrieved from the buffer of the first guest OS or the buffer of the first guest application by the first network device for transmission over the network;
in response to a second request of the second guest OS to send a second data packet to a second network device driver of a second network device, querying, by the processing device, the second network device driver on whether the second network device has a zero copy capability; and
responsive to receiving a response from the second network device driver that the second network device does not have the zero copy capability:
 copying the second data packet from a buffer of the second guest OS to the hypervisor buffer; and
 notifying, by the hypervisor, the second network device driver about the second data packet residing in the hypervisor buffer to cause the second data packet to be retrieved from the hypervisor buffer by the second network device for transmission over the network.

2. The method of claim 1 further comprising:
obtaining, by the hypervisor, properties of the first network device; and
communicating, by the hypervisor, the properties of the first network device to the first guest OS to configure properties of a driver of the first guest OS.

3. The method of claim 2 wherein the network stack processing is performed based on the configured properties of the driver of the first guest OS.

4. The method of claim 1 wherein the first network device has the zero copy capability if the first network device, when instructed to perform a zero copy transmission, is configured to cause a packet destructor to be called within a predefined time period after being notified of the first data packet to be transmitted, and to prevent access to data in the first data packet after the packet destructor is called.

5. The method of claim 4 wherein the first network device has the zero copy capability if the first network device is further configured to access data in arbitrary memory locations according to a gather list of the first data packet.

6. The method of claim 1 further comprising:
upon determining that a zero copy transmission is to be used, attaching to the first data packet additional information including at least one of a zero copy transmission indicator, a destructor function to be used by the first network device for the first data packet, or a context pointer.

7. The method of claim 6 wherein determining whether a zero copy transmission is to be used comprises:
determining, based on the query response of the first network device driver, that the first network device has the zero copy capability;
determining whether the size of the first data packet exceeds a threshold;
if the size of the first data packet does not exceed a threshold, determining that the zero copy transmission is not to be used for the first data packet; and
if the size of the data packet exceeds the threshold, determining that the zero copy transmission is to be used for the first data packet.

8. The method of claim 6 wherein determining whether a zero copy transmission is to be used comprises:
determining, based on the query response of the first network device driver, that the first network device has the zero copy capability;
determining that a number of small-size fragments in a gather list of the first data packet exceeds a threshold;
copying the small size fragments to the hypervisor buffer; and
determining that the zero copy transmission is to be used for the remaining fragments in the gather list of the first data packet.

9. The method of claim 6 wherein determining whether a zero copy transmission is to be used comprises:
determining, based on the query response of the first network device driver, that the first network device has the zero copy capability;
determining that portions of the first data packet require extra processing;
copying the portions that require extra processing to the hypervisor buffer; and
determining that the zero copy transmission is to be used for the remaining portions of the first data packet.

10. The method of claim 6 wherein determining whether a zero copy transmission is to be used comprises:
determining, based on the query response of the first network device driver, that the first network device has the zero copy capability;
determining that a header of the first data packet includes incomplete information;
copying the header of the first data packet to the hypervisor buffer; and
determining that the zero copy transmission is to be used for a payload of the first data packet.

11. The method of claim 1 wherein the first network device driver receives a notification of the hypervisor about the first data packet to be transmitted using a zero copy transmission, and determines whether to use the zero copy transmission for the first data packet.

12. The method of claim 1 wherein:
a transmission checksum is calculated during the networking stack processing; and
the first network device does not support transmission checksum calculations.

13. A non-transitory computer readable storage medium including instructions that, when executed by a host computer system, cause the host computer system to perform a set of operations comprising:
receiving, by a processing device executing a hypervisor of the host computing system, first request of a first guest operating system (OS) to send a first data packet associated with a first guest application to a first network device driver of a first network device for transmission over a network, the first data packet having gone through networking stack processing performed by the first guest OS, the first data packet residing in a buffer of the first guest OS or a buffer of the first guest application and having at least a partial header created during the networking stack processing;
allocating a hypervisor buffer accessible by the hypervisor but not the first guest OS or a second guest OS;
in response to the first request of the first guest OS, querying, by the processing device, the first network device driver on whether the first network device has a zero copy capability;
responsive to receiving a response from the first network device driver that the first network device has the zero copy capability:
refraining from copying the first data packet to the hypervisor buffer; and
notifying, by the hypervisor, the first network device driver about the first data packet residing in the buffer of the first guest OS or the buffer of the first guest application to cause the first data packet to be retrieved from the buffer of the first guest OS or the buffer of the first guest application by the first network device for transmission over the network;
in response to a second request of the second guest OS to send a second data packet to a second network device driver of a second network device, querying, by the processing device, the second network device driver on whether the second network device has a zero copy capability; and
responsive to receiving a response from the second network device driver that the second network device does not have the zero copy capability:
copying the second data packet from a buffer of the second guest OS to the hypervisor buffer; and
notifying, by the hypervisor, the second network device driver about the second data packet residing in the hypervisor buffer to cause the second data packet to be retrieved from the hypervisor buffer by the second network device for transmission over the network.

14. The computer readable storage medium of claim 13, wherein the first network device has the zero copy capability if the first network device, when instructed to perform a zero copy transmission, is configured to cause a packet destructor to be called within a predefined time period after being notified of the first data packet to be transmitted, and to prevent access to data in the first data packet after the packet destructor is called.

15. The computer readable storage medium of claim 14 wherein the first network device has the zero copy capability if the first network device is further configured to access data in arbitrary memory locations for the first data packet according to a gather list of the first data packet.

16. The computer readable storage medium of claim 13 further comprising:
upon determining that a zero copy transmission is to be used, attaching to the first data packet additional information including at least one of a zero copy transmission indicator, a destructor function to be used by the first network device for the first data packet, or a context pointer.

17. The computer readable storage medium of claim 13 wherein the first network device driver receives a notification of the hypervisor about the first data packet to be transmitted using a zero copy transmission, and determines whether to use the zero copy transmission for the first data packet.

18. The computer readable storage medium of claim 13 wherein:
a transmission checksum is calculated during the networking stack processing; and
the first network device does not support transmission checksum calculations.

19. A computer system comprising:
a memory;
a network device coupled to the memory;
at least one processor coupled to the memory; and
a hypervisor, executed by the processor from the memory to:
receive a first request of a first guest operating system (OS) to send a first data packet associated with a guest application to a first network device driver of a first network device for transmission over a network, the first data packet having gone through networking stack processing performed by the guest OS, the first data packet residing in a buffer of the first guest OS or a buffer of the first guest application and having at least a partial header created during the networking stack processing;
allocate a hypervisor buffer accessible by the hypervisor but not the first guest OS or a second guest OS;
in response to the first request of the first guest OS, query the first network device driver on whether the first network device has a zero copy capability;
responsive to receiving a response from the first network device driver that the first network device has the zero copy capability:
refrain from copying the first data packet to the hypervisor buffer; and
notify the first network device driver about the first data packet residing in the buffer of the first guest OS or the buffer of the first guest application to cause the first data packet to be retrieved from the buffer of the first guest OS or the buffer of the first guest application by the first network device for transmission over the network;
in response to a second request of the second guest OS to send a second data packet to a second network device driver of a second network device, query the second network device driver on whether the second network device has a zero copy capability;
responsive to receiving a response from the second network device driver that the second network device does not have the zero copy capability:
copy the second data packet from the buffer of the second guest OS to the hypervisor buffer; and
notify the second network device driver about the second data packet residing in the hypervisor buffer to cause the second data packet to be retrieved from the hypervisor buffer by the second network device for transmission over the network.

20. The system of claim 19, wherein the first network device has the zero copy capability if the first network device, when instructed to perform a zero copy transmission, is configured to cause a packet destructor to be called within a predefined time period after being notified of the first data packet to be transmitted, and to prevent access to data in the first data packet after the packet destructor is called.

21. The system of claim 20 wherein the first network device has the zero copy capability if the first network device is further configured to access data in arbitrary memory locations for the first data packet according to a gather list of the first data packet.

22. The system of claim 19 wherein the first network device driver receives a notification of the hypervisor about the first data packet to be transmitted using a zero copy transmission, and determines whether to use the zero copy transmission for the data packet.

23. The system of claim 19 wherein:
a transmission checksum is calculated during the networking stack processing; and
the first network device does not support transmission checksum calculations.

* * * * *